US010951080B2

(12) United States Patent
Mikail et al.

(10) Patent No.: US 10,951,080 B2
(45) Date of Patent: Mar. 16, 2021

(54) WINDINGS FOR AN ELECTRIC MACHINE (71) Applicant: ABB Schweiz Ag, Baden (CH)

(72) Inventors: Rajib Mikail, Raleigh, NC (US); Steven Englebretson, Raleigh, NC (US); Zhiguo Pan, Cary, NC (US)

(73) Assignee: ABB Schweiz AG, Baden (CH)

( * ) Notice: Subject to any disclaimer, the term of this patent is extended or adjusted under 35 U.S.C. 154(b) by 234 days.

(21) Appl. No.: 15/999,554

(22) Filed: Aug. 20, 2018

(65) Prior Publication Data

US 2019/0013711 A1 Jan. 10, 2019

Related U.S. Application Data (63) Continuation of application No. PCT/US2017/018640, filed on Feb. 21, 2017.
(Continued)

(51) Int. Cl.
*H02K 3/28* (2006.01)
*H01F 5/04* (2006.01)
(Continued)

(52) U.S. Cl.
CPC .............. *H02K 3/28* (2013.01); *H01F 5/04* (2013.01); *H01F 41/10* (2013.01); *H02K 1/16* (2013.01); *H02K 1/26* (2013.01); *H02K 3/12* (2013.01); *H02K 3/50* (2013.01); *H02K 11/21* (2016.01); *H02K 11/215* (2016.01); *H02K 11/22* (2016.01); *H02K 11/225* (2016.01); *H02K 17/14* (2013.01); *H02K 11/33* (2016.01); *H02K 2203/03* (2013.01); *H02K 2203/09* (2013.01)

(58) Field of Classification Search
CPC .. H01F 5/04; H01F 41/10; H02K 1/16; H02K 3/12; H02K 3/28; H02K 3/48; H02K 11/21; H02K 11/215; H02K 11/22; H02K 11/225; H02K 11/33; H02K 17/14; H02K 2203/03; H02K 2203/09
USPC ................................ 310/68 B, 71, 214, 215
See application file for complete search history.

(56) References Cited

U.S. PATENT DOCUMENTS 3,551,715 A 12/1970 Silvertown
4,096,625 A 6/1978 Morreale
(Continued)

FOREIGN PATENT DOCUMENTS

EP 1168574 1/2002

OTHER PUBLICATIONS

Written Opinion and Search Report, PCT Appln. No. PCT/US17/18640, dated Jun. 15, 2017, 10 pgs.
(Continued)

*Primary Examiner* — Tulsidas C Patel
*Assistant Examiner* — Rashad H Johnson
(74) *Attorney, Agent, or Firm* — Taft Stettinius & Hollister LLP (57) ABSTRACT There are disclosed winding configurations for electric machines that employ printed circuit board (PCB) type end winding connections to enable an automatic and faster assembly of the electric machines. The winding configurations provide a compact PCB-type end winding arrangement with an optimal fewer number of turns/bars in the slots of the board to complete the loop of winding connections. The winding configurations have application in three phase or multiple phase inner rotor or outer rotor electric machine topologies.

23 Claims, 8 Drawing Sheets

Related U.S. Application Data (60) Provisional application No. 62/296,955, filed on Feb. 18, 2016.

(51) Int. Cl.

| | | |
|---|---|---|
| *H01F 41/10* | (2006.01) | |
| *H02K 11/22* | (2016.01) | |
| *H02K 11/225* | (2016.01) | |
| *H02K 3/50* | (2006.01) | |
| *H02K 11/215* | (2016.01) | |
| *H02K 11/21* | (2016.01) | |
| *H02K 1/16* | (2006.01) | |
| *H02K 1/26* | (2006.01) | |
| *H02K 3/12* | (2006.01) | |
| *H02K 17/14* | (2006.01) | |
| *H02K 11/33* | (2016.01) | |

(56) References Cited

U.S. PATENT DOCUMENTS

| | | |
|---|---|---|
| 4,115,915 A | 9/1978 | Godfrey |
| 4,584,497 A | 4/1986 | Butman, Jr. et al. |
| 6,411,002 B1* | 6/2002 | Smith .................. H02K 1/182 310/156.01 |
| 8,018,113 B2 | 9/2011 | Tang |
| 8,058,765 B2 | 11/2011 | Rahman et al. |
| 8,269,386 B2 | 9/2012 | Kaiser et al. |
| 8,443,509 B1 | 5/2013 | De Souza et al. |
| 8,633,728 B2 | 1/2014 | Panozzo |
| 8,669,681 B2 | 3/2014 | Kaiser et al. |
| 2005/0057111 A1 | 3/2005 | Han et al. |
| 2005/0212640 A1 | 9/2005 | Chiang et al. |
| 2009/0096310 A1* | 4/2009 | Takeuchi ............ H02K 21/24 310/156.36 |
| 2009/0111294 A1 | 4/2009 | Barry et al. |
| 2009/0140596 A1 | 6/2009 | Kaiser et al. |
| 2013/0020890 A1* | 1/2013 | Iki ..................... H02K 3/50 310/71 |
| 2013/0075371 A1 | 3/2013 | De Souza et al. |
| 2013/0076175 A1 | 3/2013 | Turnbull et al. |
| 2013/0118002 A1 | 5/2013 | Burke et al. |
| 2014/0319960 A1 | 10/2014 | Iki |
| 2015/0145358 A1 | 5/2015 | Cho et al. |
| 2015/0229173 A1* | 8/2015 | Sromin ................ H02K 21/24 310/208 |
| 2015/0280503 A1* | 10/2015 | Takahashi ............ H02K 3/50 310/201 |
| 2017/0098973 A1* | 4/2017 | Shaw .................. H05K 1/0298 |

OTHER PUBLICATIONS

IEEE Recommended Practice for Thermal Cycle Testing of Form-Wound Stator Bars and Coils for Large Generators. IEEE Std 1310-1996, May 23, 2012, pp. 1,24.

Prosr, P.; Mentlik, V.; Polansky, R., "A new method of lifetime estimation for high-voltage insulating systems in rotating machines," Electrical Insulation and Dielectric Phenomena (CEIDP), 2011 Annual Report Conference, pp. 607,610, Oct. 16-19, 2011.

Wanjun Zhang; Jahns, T.M., "Analytical 2-D slot model for predicting AC losses in bar-wound machine windings due to armature reaction," Transportation Electrification Conference and Expo (ITEC), 2014 IEEE, pp. 1,6, Jun. 15-18, 2014.

Xiang Peng; Zhidong Jia; Shengqiang Gao; Liming Wang; Zhicheng Guan, "Study on stator winding degradation under bar vibration," Electrical Insulation and Dielectric Phenomena, 2009. CEIDP '09. IEEE Conference, pp. 100,103, Oct. 18-21, 2009.

Jurkovic, S.; Rahman, K.; Morgante, J.; Savagian, P., "Induction Machine Design and Analysis for General Motors e-Assist Electrification Technology," Industry Applications, IEEE Transactions, vol. PP, No. 99, pp. 1-9.

Lei Hao, "Design and analysis of IPM machine with bar wound fractional slot distributed winding for automotive traction application," Energy Conversion Congress and Exposition (ECCE), 2013 IEEE, pp. 598,605, Sep. 15-19, 2013.

Rahman, K.; Jurkovic, S.; Stancu, C.; Morgante, J.; Savagian, P., "Design and performance of electrical propulsion system of extended range electric vehicle (EREV) Chevrolet Voltec," Energy Conversion Congress and Exposition (ECCE), 2012 IEEE, pp. 4152-4159, Sep. 15-20, 2012.

Extended European Search Report, EP Appln. No. 17754024.2, dated Sep. 24, 2019, 10 pgs.

European Patent Application No. 17754024.2, Office Action dated 18 Nov. 2020, 7 pp.

\* cited by examiner

Fig. 14 ly, of a part of a winding configuration on an exemplary
WINDINGS FOR AN ELECTRIC MACHINE

FIELD OF THE INVENTION

The present disclosure is related to winding configurations for electric machines.

BACKGROUND

Stranded conductors are traditionally used for machine winding arrangements, such as two layer concentric type of windings that are applied manually. Manual winding techniques can be time consuming and inefficient. With conventional random winding techniques for electric machines, it has been found to be difficult to automate the winding process. Furthermore; due to the high part-to-part variation, an overdesign of the machine components is required to meet final performance measures. This requires an increase in size of the parts, an increase in the cost of the parts, and a lower filling factor and power density for the windings placed on the part. In addition, manufacturing cost is increased due to a larger number of steps being required in the manufacturing process along with the manual manufacturing steps in applying the windings.

What is needed therefore is a system and method for electric machine windings that can be automated so that the machine parts can be built through a robotic manufacturing process and assembly, allowing a reduction in the size of the parts containing the windings, reducing manufacturing costs, reducing part-to-part variations, and providing an improved filling factor and power density of the windings. The present disclosure is directed to a winding system and method that addresses these needs, among others.

SUMMARY

The present disclosure includes novel winding configurations for electric machines such as electric motors by employing printed circuit board (PCB) type end winding connections for automatic and faster assembly processes. The winding configurations provide a compact PCB end winding arrangement with an optimal fewer number of turns/bars in the slots of the board to complete the loop of winding connections. The novel winding configurations have application in three phase or multiple phase inner rotor or outer rotor electric machine topologies.

In one embodiment, the winding configuration involves multiple boards that are stacked and define inner slots opening toward inner edges of the boards. A number of straight, rectangular in cross-section, conductor bars are bundled into a single piece, and a bundle of bars is placed into each of the slots. The winding configuration includes end windings with conductive traces connected to the ends of each of the bars. The lengths of the bars in each of the bundles are such that each end of each bar in the bundle reaches a different board to complete the winding loop. In a specific embodiment, a lap winding coil-first topology achieves the basic electromagnetic flux paths and the required air-gap flux density for each board with appropriate joining methods to make the joints between the bars and boards.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION

Figure 1:
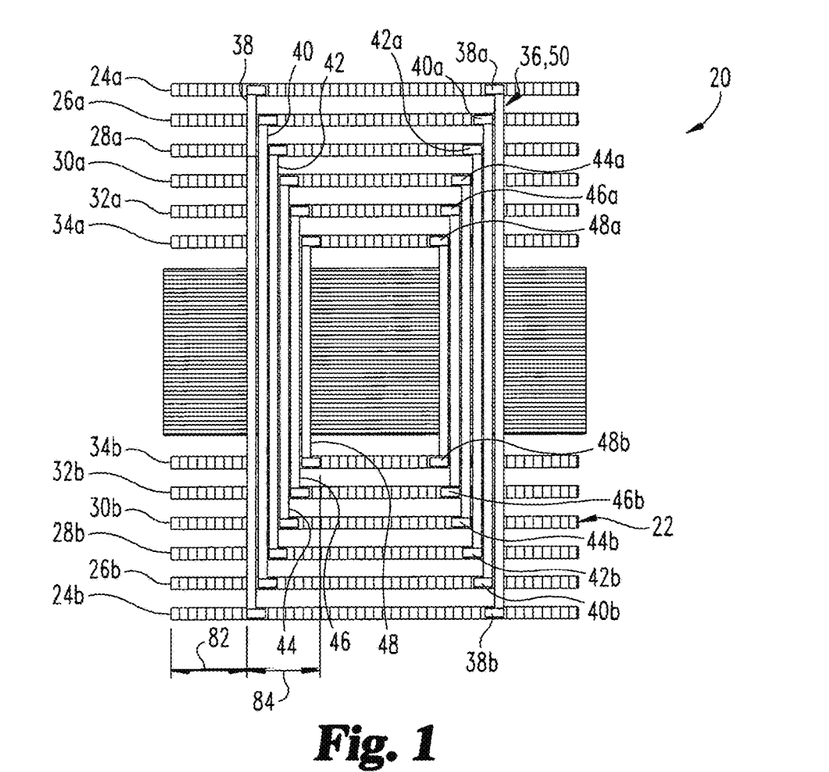
FIG. 1 is a schematic cross-sectional view of one embodiment of an electric machine in which multiple pairs of boards are connected with corresponding ones of a number of bars arranged in aligned slots along the stacked boards.

Referring to FIG. 1, there is disclosed herein an electric machine 20 that includes a plurality of boards 22 that include front boards 24a, 26a, 28a, 30a, 32a, 34a and a plurality of rear boards 24b, 26b, 28b, 30b, 32b, 34b. The terms "front" and "rear" are used herein to reference the front and rear of the electrical machine 20 as used during nominal operations, but relative locations of the components referred to herein as being "front" or "rear" should not be construed as limiting unless specifically noted otherwise. The boards individually and collectively may be generally referred to herein as board(s) 22, it being understood that the any one or combination of the front and rear boards are being referred to unless specified otherwise. Boards 22 include a yoke area 82 that can be comprised of any suitable non-conductive material, such as is used for printed circuit boards. Boards 22 also include a connector area 84 extending between the inner circumferential edge 56 and yoke area 82 that is comprised of conductive material and defines slots 58. The representative portion of the electric machine 20 shown in FIG. 1 includes an inner rotor of a three phase induction type electric machine, but the present disclosure also has application in to other permanent magnet (PM) or non-PM machine topologies.

Electric machine 20 further includes a plurality of conductor bar stacks 36, each of which includes a number of conductor bars 38, 40, 42, 44, 46, 48. Although six conductor bars are shown in the illustrated embodiment, more or fewer conductor bars in each conductor bar stack 36 are also contemplated. Conductor bars 38, 40, 42, 44, 46, 48 are successively shorter in length so that the opposite ends of each bar are aligned with a pair of opposed boards 22. For example, conductor bar 38 extends between opposite ends 38a, 38b, and end 38a is connected to board 24a and end 38b is connected to board 24b. Conductor bar 40 extends between opposite ends 40a, 40b, and end 40a is connected to board 26a and end 40b is connected to board 26b. Conductor bar 42 extends between opposite ends 42a, 42b, and end 42a is connected to board 28a and end 42b is connected to board 28b. Conductor bar 44 extends between opposite ends 44a, 44b, and end 44a is connected to board 30a and end 44b is connected to board 30b. Conductor bar 46 extends between opposite ends 46a, 46b, and end 46a is connected to board 32a and end 46b is connected to board 32b. Conductor bar 48 extends between opposite ends 48a, 48b, and end 48a is connected to board 34a and end 48b is connected to board 34b. The conductor bar stacks 36 individually and collectively may be generally referred to herein as bar stack(s) 36, it being understood that the any one, all or combination of the bar stacks are being referred to unless specified otherwise. In addition, the conductor bars 38, 40, 42, 44, 46, 48 may be generally referred to herein as bar 50.

Figure 2A:
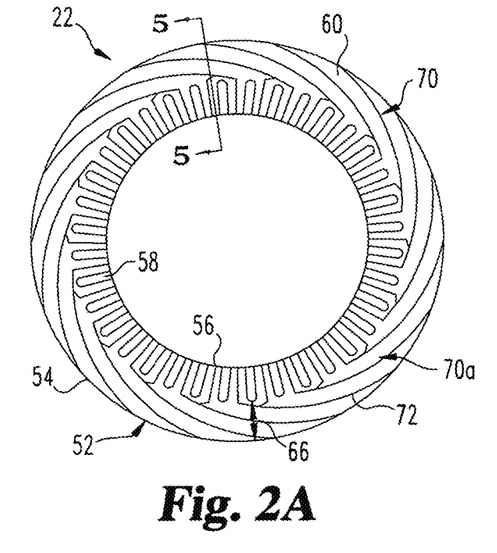
FIGS. 2A and 2B are top and bottom plan views, respectively, of a part of a winding configuration on an exemplary board for connecting the ends of the corresponding bars that are aligned with the board.
Figure 2B:
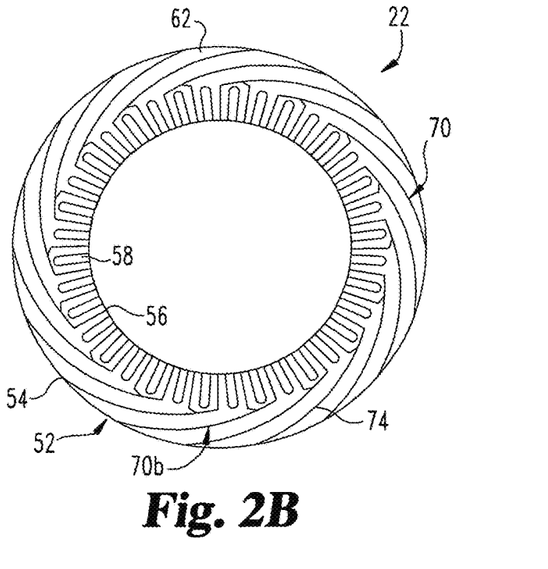

Referring further to FIGS. 2A and 2B, there is shown top and bottom plan views of board 22 with a winding configuration 70 including end windings 70a, 70b shown thereon in yoke area 82. For example, board 22 in the illustrated embodiment includes a planar body 52 extending between an outer circumferential edge 54 and an inner circumferential edge 56. Planar body 52 also defines a front or first surface 60 and an opposite back or second surface 62. Inner circumferential edge 56 includes a plurality of radially outwardly extending slots 58 extending therefrom that open at edge 56. A bar stack 36 is placed into each of the slots 58 so that bars 50 thereof connect the respective pairs of boards 24a-24b, 26a-26b, 28a-28b, 30a-30b, 32a-32b, 34a-34b to one another. In the illustrated embodiment, thirty-six slots 58 are provided to receive respective ones of thirty-six bar stacks 36.

End winding 70a includes a number of conductive traces 72 on first surface 60 and end winding 70b includes a number of conductive traces 74 on second surface 62. Each trace 72 is connected to an end of a bar 50 in a first one of the slots 58 to another bar 50 in a second one of the slots 58 in the illustrated embodiment, traces 72 on first surface 60 are connected to a respective one of every other ones of the slots 58, and traces 74 on second surface 62 are connected to a respective one of every other ones of the slots 58, where adjacent ones of the slots in the first portion of slots 58 connected with traces 72 are separated by a slot of the second portion of slots 58 connected with traces 74.

The bars 50 can include a rectangular cross-section with a number of bars stacked one upon the other in each slot 58. In one embodiment, bars 50 in each stack are bundled together with high temperature tape to hold the bars together. The rectangular cross-section and bundling provides a higher fill factor in each slot 58, which enables higher torque density and compact winding configuration to increase the volume density of the electric machine 20. Each bar 50 also includes an L-shaped configuration at each end thereof to facilitate connection with the respective adjacent board 22, allowing more soldering area and a stronger connection with connection area 84 than would be provided by a straight bar, although the use of a straight bar and/or a non-rectangular cross-section is not precluded in the present disclosure. The lengths of the various bars 50 depend on the thickness of the boards 22 and the size of any gap between the adjacent boards 22 to be connected by the bar 50.

The proposed connection arrangement between the bars 50 and each board 22 provides conductive trace connection sites for the end windings 70a, 7b of winding configuration 70 on both the upper and lower surfaces of each board 22. The length of each bar 50 is sized to extend between the two boards 22 to be connected to one another with traces for the windings provided on both surfaces of both of the connected boards 22. The traces can therefore be evenly distributed and have the same configuration on the front and back surfaces of each of the boards 22 used in the electric machine 20.

Figure 3A:
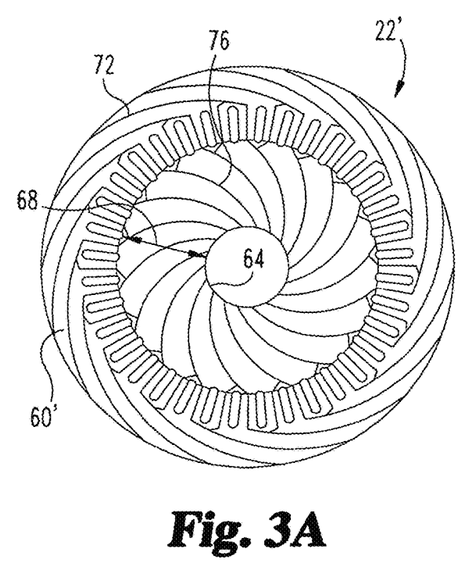
FIGS. 3A and 3B are top and bottom plan views, respectively, of another embodiment board where the rotor space is utilized for the wining configuration in addition to the stator space.
Figure 3B:
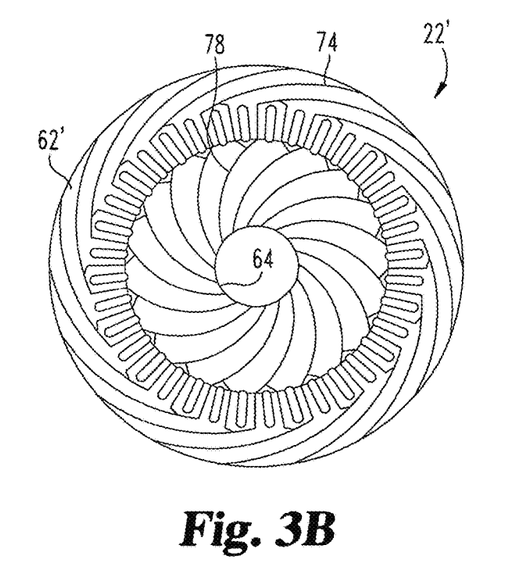
Figure 4:
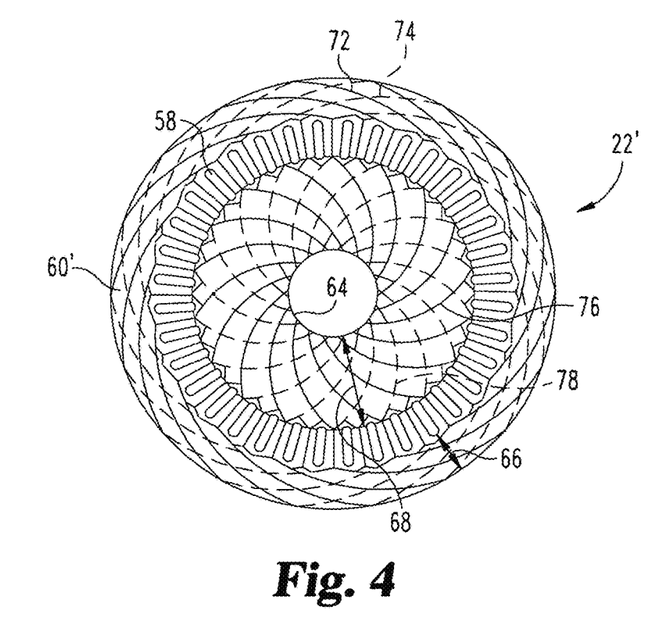
FIG. 4 is a plan view of the board with complete windings in the stator and rotor areas.

In FIGS. 2A and 2B, the end windings 70a, 70b of winding configuration 70 is applied to the stator area 66 of board 22, which can be defined by the yoke 82. However, in another embodiment of board. 22, designated as 22' in FIGS. 3A and 3B, the end winding topology is also applied to the rotor area 68 of board 22'. Thus, an even more compact design for the board 22' is possible. The traces 76 on the first surface 60' and traces 78 on second surface 62' extend from corresponding ones of every other ones of the slots 58 to the inner circumferential edge 64, which is separated from slots 58 by rotor area 68. As discussed further below, and as shown in FIG. 4, the pitch of the traces 76, 78 can correspond to the pitch of traces 72, 74, which is a pitch of ten in the illustrated embodiments. The widths of traces 76, 78 and the radius of inner circumferential edge 64 can be sized based on the required resistance to be provided. Furthermore, since the area of traces on each board 22' is increased due to utilization of both the stator area 66 and the rotor area 68, the number of boards 22' in the stack can be reduced relative to a design that utilizes only the stator area.

Figure 5:
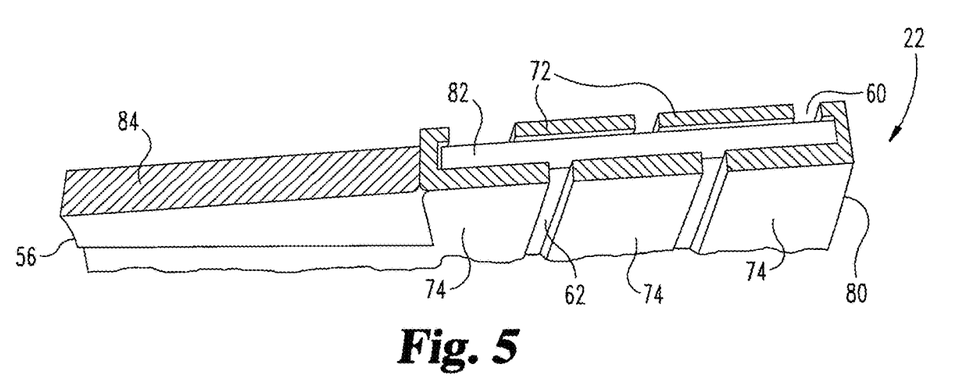
FIG. 5 is an example of a cross-section of a board as shown in FIGS. 2A and 2B along line 5-5 of FIG. 2A.

Referring to FIG. 5, a cross-section of the embodiment of board 22 in FIGS. 2A and 2B is shown along the radius of the outer circumferential edge 54 of board 22. Board 22 includes a number of side-by-side planar traces 72 on first surface 60 and a number of side-by-side planar traces 74 on second surface 62. The traces 72, 74 are sized so that in the cross-section two traces 72 and two traces 74 are provided in the yoke area 82. In addition, outer circumferential edge 54 includes edge traces 80 extending between the first and second surfaces 60, 62 that are connected to traces 72, 74 to electrically link the bars 50 in the slots 58 to one another.

The winding configuration 70 disclosed herein allows for optimization of the active material which is used in the traces of board 22. The traces 72, 74 are made from copper and/or aluminum, but the present disclosure has application with any material for conductive traces that is capable of carrying nominal current. Optimization of the material amount of the traces allows for reduced cost.

Figure 6:
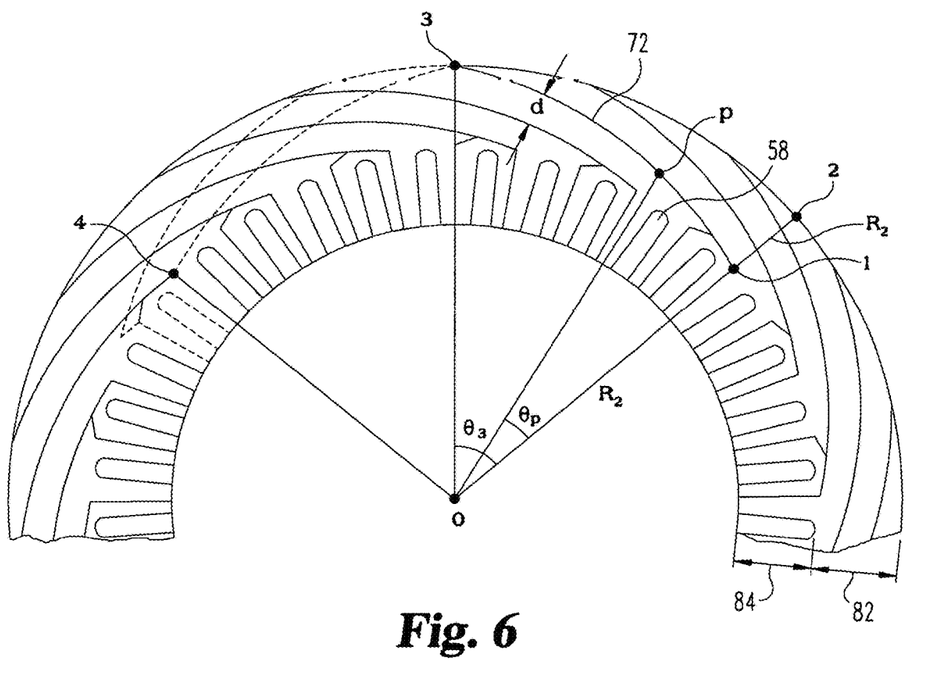
FIG. 6 is a plan view of a portion of the board of FIGS. 2A and 2B showing one embodiment of an arrangement for optimization, of the winding configuration on the board.

In FIG. 6 the angle $\theta_3$ depends on the pitch and is described by equation (1) as follows:

$$\theta_3 = 360 \times \frac{Yp}{2S} \tag{1}$$

where $Y_p$ is the pitch number and S is the number of slots 58. For the representative design of FIGS. 2A and 2B, $Y_p$ is 10 and S is 36.

As shown in FIG. 6, the traces 72 start from an inner radius $R_1$ at the outer end of the respective slot 58 and end at an outer radius $R_2$ at outer circumferential edge 54. A point P in the trace 72 from point 1 to point 3 is represented by equations (2) and (3):

$$R_{px} = \left\{R_1 + (R_2 + R_1)\frac{\theta_p}{\theta_3}\right\}\cos\Theta_p \quad (2)$$

$$R_{py} = \left\{R_1 + (R_2 + R_1)\frac{\theta_p}{\theta_3}\right\}\sin\Theta_p \quad (3)$$

Tangentially each trace at radius $R_1$ has an angular width of 2*360/S degrees. The trace width is defined by d as shown in FIG. 5 and is determined by equation (4):

$$d = \sqrt{\left[\left\{R_1 + \frac{(R_2 - R_1)4}{Y_p}\right\}\cos\left(2*\frac{360}{S}\right)\right]^2 + \left[\left\{R_1 + \frac{(R_2 - R_1)4}{Y_p}\right\}\sin\left(2*\frac{360}{S}\right)\right]^2} - R_1 \quad (4)$$

The cross sectional area of each trace $A_t$ is defined by the following equation:

$$A_t = d \times w \quad (5)$$

where w is the trace thickness and d is the width of the trace.

The nominal current in the bar 50 is determined while designing the electromagnetics of the electric machine 20. The same bar current flows through the connected trace 72, 74 on the board 22. The trace cross section and length defines the resistance and the resistive loss due to the current. With a fixed board thickness, the cross section. $A_t$ is higher with a higher outer radius $R_2$ of the board 22. For a fixed inner radius $R_1$, the lower the outer radius $R_2$ is, the lower the cost and the required active material for board 22 is. The selection of outer radius $R_2$ is determined based on the required end winding resistance, which depends on the cross section $A_t$.

The winding configuration 70 for electric machine 20 disclosed herein can be divided into parts that can be installed following some predefined controlled steps. For example, the winding configuration 70 can be divided into two parts, with a first part including the bar stacks. 36 that each include a number of bars 50 bundled into a single unit. A separate bar stack 36 is placed into each of the slots 58 of the boards 22. The second part of the winding configuration 70 includes the end windings 70a, 70b and traces 72, 74 on each of the boards 22 that provide the end winding connections. The number of traces 72, 74 in the end windings 70a, 70b on each board. 22 depends on the board design, the number of slots 58, and the number of bars 50 in each bar stack 36.

The winding configuration 70 is designed such that all of the bars 50 are connected with uniformly distributed phase impedance. The winding configuration 70 also provides two layers of connection traces on each board 22 to complete all the connections to provide maximum utilization of the yolk area on both front and back surfaces of each board 22. For the proposed end winding configuration 70, the topology provides maximum space and conductive material utilization and is more compact to utilize the available space more efficiently than concentric winding arrangements.

Figure 7:
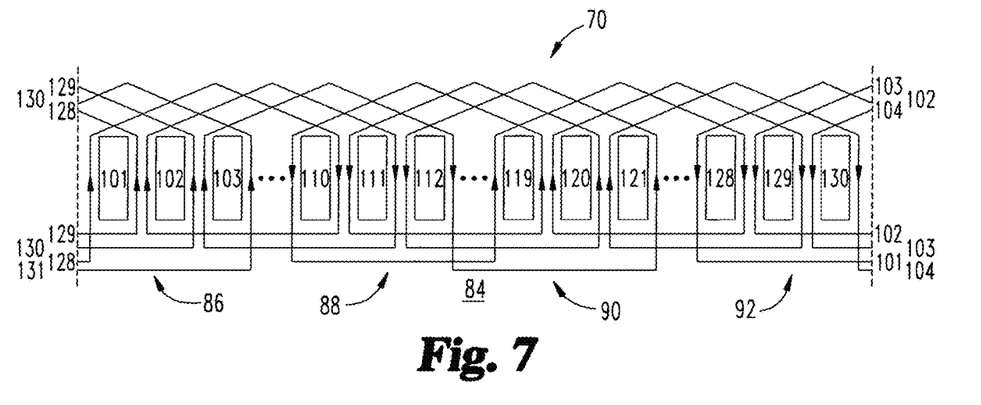
FIG. 7 is a schematic view of a two layer lap winding arrangement for an electric machine having four poles and thirty-six slots.

FIG. 7 presents a basic view of a two layer lapped end winding arrangement of winding configuration 70 for a four pole, thirty-six slot, three, phase induction type electric machine. The individual slots 58 are identified numerically as slots 101, 102, 103 . . . , 110, 111, 11.2 . . . , 119, 120, 121 . . . , 128, 129, 130 . . . , defining respective ones of four phase clusters of the first phase of the electric machine, it being understood that not all thirty-six slots are shown and that the phase clusters of the second and third phases are not shown in FIG. 7. As can be seen with respect to end winding 70a, trace 72 defines a pattern with a first running direction extending around a first phase cluster 86 and a second phase cluster 88, and a second running direction that extends around third phase cluster 90 and second phase cluster 88, and then charges to the first running direction around third phase cluster 90 and fourth phase cluster 92, and then changes back to the second running direction around the fourth phase cluster and the first phase cluster. As a result, each of the phase clusters 86, 88, 90, 92 and the bars in the respective slots thereof are lap wound with the adjacent phase cluster by the end winding 70a and trace 72.

In the illustrated embodiment, for the first running direction, trace 72 extends from a first side of slot 101 along yoke area 82 of board 22 to an opposite second side of slot 110, and then from the second side of slot 110 along, the connector area 84 opposite yoke area 82 to the first side of slot 102, and then along the first side of slot 102 to yoke area 82, and along yoke area 82 to the second side of slot 111, and along the second side of slot 111 to connector area 84, and along connector area 84 to the first side of slot 103, and along the first side of slot 103 to yoke area 82, and along yoke area 82 to the second side of slot 112, and along the second side of slot 112 to connector area 84. Trace 72 then extends in the first direction along connector area 84 to the second side of slot 121 for providing a lap winding in the second running direction. In the second running direction trace 80 extends along the second side of slot 121 to yoke area 82, and along yoke area 82 to the first side of slot 112. The trace 72 continues in this pattern in the second running direction back to the first side of slot 110, and then extends from slot 110 to the first side of slot 119 to repeat the first running direction pattern. Thus, in each running direction trace 72 encompasses the number slots, in the pitch (ten in the illustrated embodiment) and runs around each of the adjacent slots for the corresponding phase before reversing direction.

Figure 8:
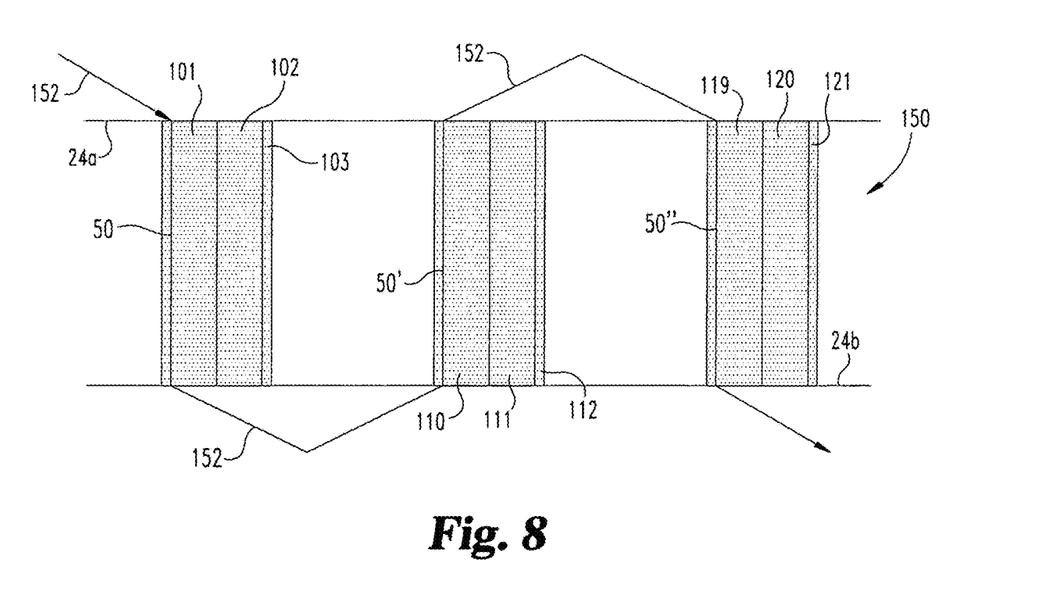
FIG. 8 is a schematic diagram showing a basic board-first end winding configuration for connection to the conductor bars.

Various connection arrangements between the end windings 70a, 70b and bars 50 are contemplated. A first board-first type connection arrangement is shown in FIG. 8 that utilizes another embodiment winding configuration 150. In FIG. 8 all the bars 50 with same height are connected through the corresponding boards 22 with a trace 152. FIG. 8 presents a simple view of this first arrangement, where the first bar 50 in slot 101 is connected through the respective boards 22' (such as boards 24a-24b discussed above) by trace 152. For example, trace 152 is connected to a first end of bar 50 in slot 101 of a first phase cluster at a first board 24a and then trace 152 is connected to second board. 24b at a second end of bar 50. Trace 152 runs on a surface of board 24b to a second bar 50' of the next phase cluster in another slot 110, and then is connected back to first board 24*a* through the second bar 50' in slot 110, where the pattern then repeats for connection to third bar 50" in the first slot of the third phase cluster. Trace 152 therefore connects the first of the bars 50 in phase clusters of the first phase, and then the second bars of the phase clusters of the first phase, and so on until each bar of each phase cluster in the first phase is connected. This pattern is repeated for each of the second and third phases.

Figure 9:
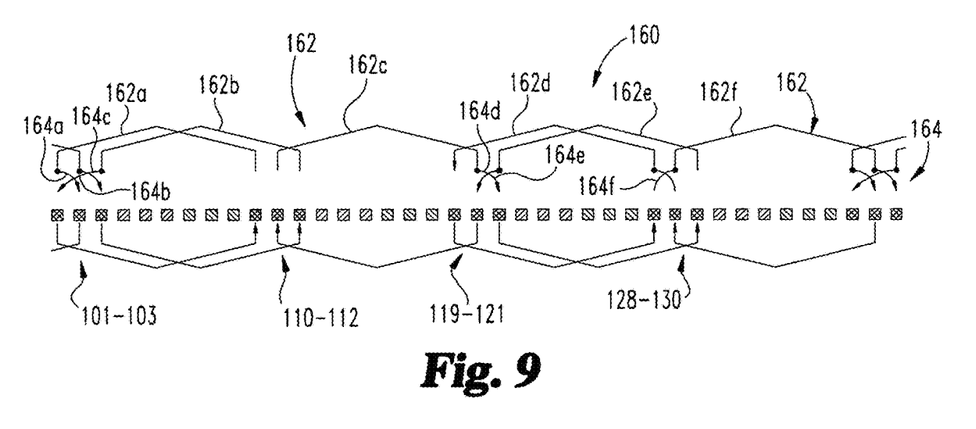
FIG. 9 is a schematic diagram showing the board end connections in a board-first winding configuration.

In FIG. 9 there is shown another embodiment winding configuration 160 for a board-first connection of a first phase of the four pole, thirty-six slot arrangement. Winding configuration 160 includes end winding 162 extending between bars 50 in the slots 101-136. In the diagram of FIG. 9, slots 101-103, 110-112, 119-121, 128-130 are associated with the bars of the four first phase clusters for the first or a phase, the adjacent sets of three slots are for the second or b phase, and the third sets of three slots are for the third or c phase. The end winding 162 and cross-over connections 164 for the second, and third phases are similar to the illustrated arrangement for the first phase.

In the first phase, trace 162*a* connects bars in slots 101 and 110, trace 162*b* connects bars in slots 103, 112, and trace 162*c* connects bars in slots 111, 120. Trace 162*d* connects bars in slots 119, 128 and trace 162*e* connects bars in slots 121, 130. Trace 162*f* connects bars in slots 129, 102. There are six cross-overs 164*a*, 164*b*, 164*c*, 164*d*, 164*e*, 164*f* of the traces 162 that cross-connect the bars to one another as shown. The number of cross-overs 164 can be reduced with electric machines 20 having an even number of slots per pole. With this board-first lap winding topology the utilization of the yolk area for each board 22 is uniform. The achievable phase resistance is the minimum with the lap winding configuration 160.

Figure 10:
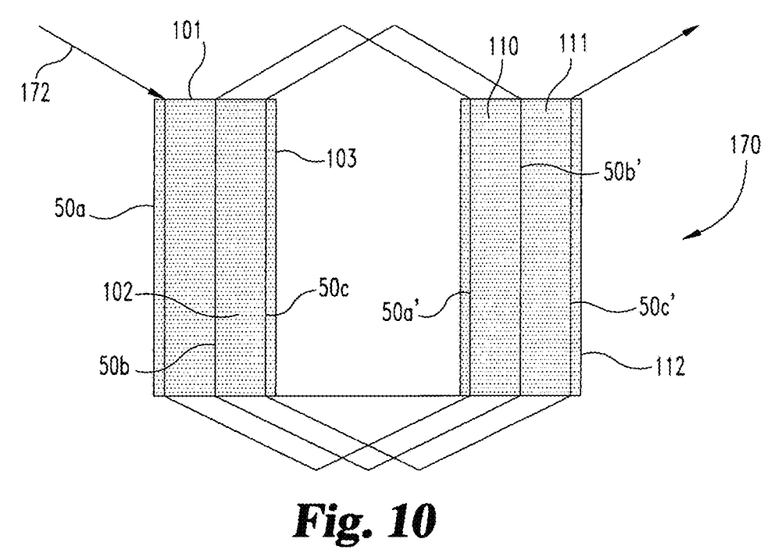
FIG. 10 is a schematic showing a basic coil-first winding configuration for connecting the conductor bars.
Figure 11:
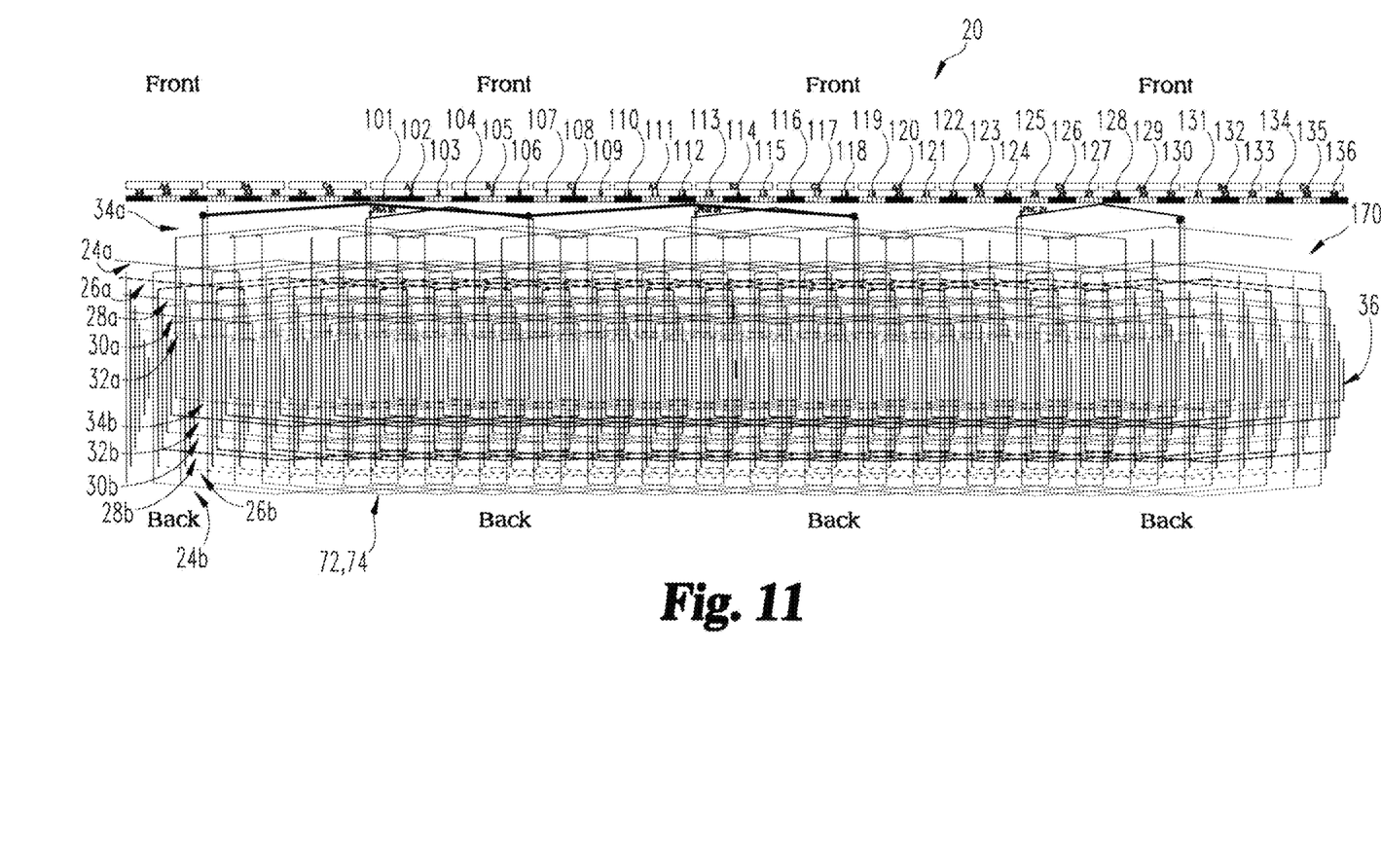
FIG. 11 is a schematic diagram of a complete coil-first, winding configuration for an electric machine.

In another embodiment a connection arrangement for the end windings and the bars 50 is shown in FIGS. 10-11 which provides a coil-first type of connection. With the coil-first connection arrangement, another embodiment winding configuration 170 is employed. The winding configuration 170 in FIG. 10 includes an end winding 172 with traces that connect all the bars 50 of the first phase cluster of the first phase to all the bars 50 in the second phase cluster, and then all the bars in the second phase cluster to all the bars in the third phase cluster, and so on. For example, end winding 172 includes traces that extend from an end of first bar 50*a* in slot. 101 to an end of first bar 50*a*' in slot 110, and from an opposite end of first bar 50*a*' to an end of second bar 50*b* in slot 102, and from an opposite end from second bar 50*b* to an end of second bar 50*b*' in slot 111, and from an opposite end of second bar 50*b*' to an end of bar 50*c* in slot 103, and from an opposite end of bar 50*c* to third bar 50*c*' in slot 112, and then to the first bar ii the next phase cluster where the pattern repeats. Thus, trace 172 completes the loop for the first phase cluster of the first phase between the paired boards 22, and then is repeated for the second, third and fourth phase clusters of the first phase. The pattern is repeated for each of the phase clusters of the second and third phases, such as shown in FIG. 11.

The coil-first connection allows each of the boards 22 in the stack to have the same design. To avoid any manufacturing steps for making the phase neutral connection, one extra board 22 can be added that includes the other low pitch traces required to make the connection. The added board 22 also requires corresponding bars 50 of appropriate length. Depending on the associated cost, this connection can potentially be done manually to avoid the extra height needed for adding another board.

Referring now to FIG. 11, there is shown a complete winding configuration 170 for a coil-first connection of one embodiment of the electric machine 20. In the illustrated embodiment, there are two hundred and sixteen bars (thirty-six bar stacks of six bars each) and, since each end of each bar is connected to a board, four hundred and thirty-two junctions among the bars and the boards 24*a*-34*b* for a three phase, four pole, thirty-six slot electric machine 20. In particular, slots 101-103, 110-112, 119-121, 128-130 comprise the clusters of phase slots for poles A1-A4 of phase a, respectively. Slots 104-106, 113-115, 122-124, 131-133 comprise clusters of phase clots for poles B1-B4 of phase b, and slots 107-109, 116-118, 125-127, 134-136 comprise the cluster of phase slots for poles C1-C4 of phase c.

In the illustrated embodiment, the odd numbered traces follow a clockwise running direction on a first side of the boards and the even numbered traces follow a counterclockwise running direction on a second surface of the boards. This pattern has the advantage to optimize the conductive surface on both the first and second surfaces of each of the boards 22 and to distribute the traces on the first and second surfaces of each of the boards 22. In the illustrated embodiment, thirty-six slots are shown, but other embodiments contemplate more or fewer slots. Each cluster of phase slots comprises an odd number of slots, which are three in this design. For a forty-eight slot machine, each phase cluster includes four slots. The proposed winding configuration 170 is applicable to electric machines with odd and even numbers of phase clusters. Winding configuration 170 is evenly distributed in all directions and does not change the flux in the air-gap region.

The bar stacks 36 include bars 50 with opposite ends engaged to the respective boards 22 so that the board-to-bar junctions are accessible on the front and back surfaces of each board 22. To facilitate the accessibility of all the board-to-bar junctions, each bar 50 in each slot 58 need not be joined to the individual board separately. Rather, the number of boards 22 should be equal to the number of bars 50 in each slot 58 and the height of the bars 50 in each slot 58 are matched to reach to their corresponding pair of boards 22. Each board 22 includes traces on its first and second surfaces with the traces evenly distributed thereon for each board 22.

As further shown in FIG. 4, the winding distribution of the conductors in the first (front in FIG. 11) and second (back in FIG. 11) of a board 22 is evenly distributed. The two traces 72, 74 in the yoke area enter in every other one of the slots 58, with traces 72 on the yoke area entering every other one of slots 58 and traces 74 on the back surface entering the other slots 58. The traces 72, 74 enter each slot 58 at an angle that depends on the slot pitch and yolk thickness. A slot 58 which has a trace 72 entering in the front surface of the board 22 does not have a trace 74 entering it at the back surface This pattern is same for all the boards having the front surface traces 72. The back surface traces 74 have a similar design which completes the connection between the winding pitch. For the thirty-six slot, four pole design, there are eighteen traces on each of the front and back surfaces that connect the thirty-six bar stacks 36 for each loop of the winding configuration.

Figure 12:
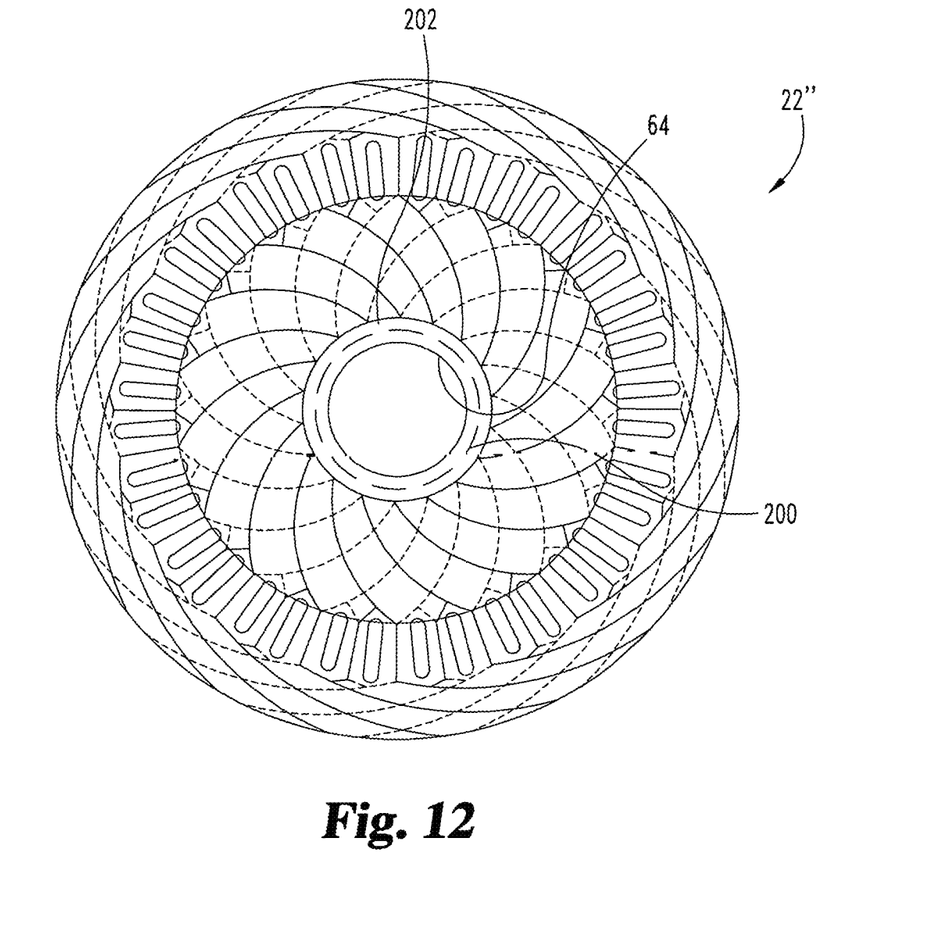
FIG. 12 is a plan view of another embodiment board including the winding configuration of FIG. 4 with a position sensor.

Referring to FIG. 12, the proposed winding configurations discussed herein can be integrated with a position sensing component for machine topologies where a position sensor is necessary or desired. For example, board 22" includes a position sensor 200. A position sensor could also be integrated in the single board arrangement discussed below. In FIG. 12, it is shown that the inner radial section 202 adjacent the inner circumferential edge 64 has the position sensor electronics integrated therein. This inner radial section 202 can include, for example, a position sensor 202 that is configured to count the position as a finite digital step or an analog sinusoidal signal. The position sensor 202 can be integrated with the end winding configuration but is not limited to such, and may include Hall Effect, resolver type, inductive coupling, eddy current, optical receivers, reflected gray decoding, and other types of position sensors.

Integrating an inductive type position sensor 202 in the board 22" also enables real time end-of-line (EOL) calibration of eccentricity and alignment of the electric machine. While mounting the rotor there is always some eccentricity within a tolerance band. With the position sensor signals it is possible to measure the eccentricity. During the assembly process, the system can provide feedback via position sensor 202 to guide the bearing placement and automate the assembly process with a finer precision. It is also possible to establish communication of the position sensor 202 with external calibrator and alignment tools to provide feedback on the alignment process and to automate the alignment itself.

Figure 13A:
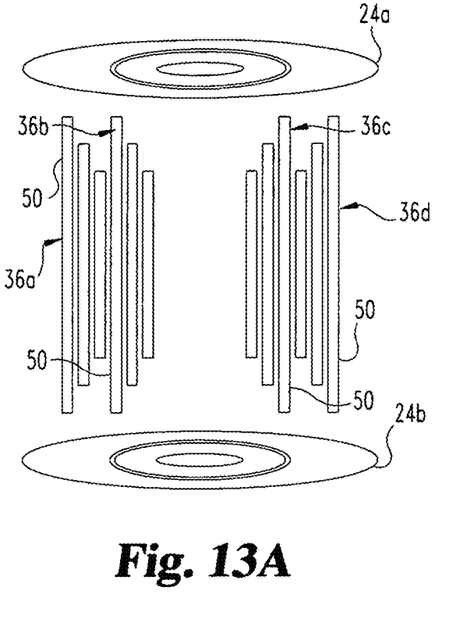
FIGS. 13A and 13B are schematic diagrams showing a doubled sided arrangement with spaced apart boards and the corresponding straight bars for connecting the spaced apart boards, and a single sided board with U-shaped bars for connecting opposite parts of the single sided board, respectively.
Figure 13B:
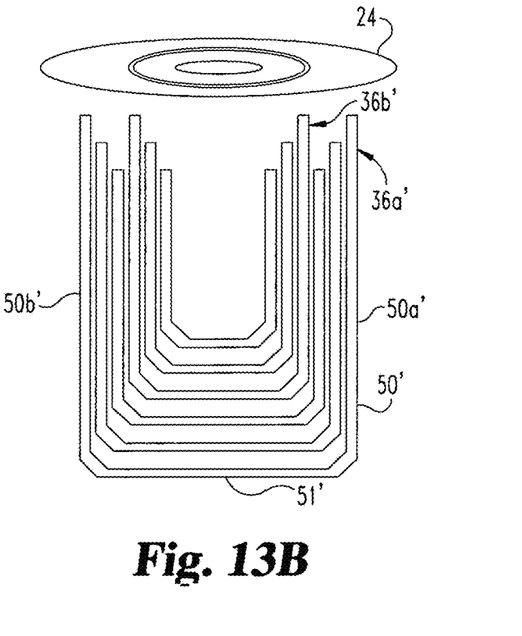

Referring to FIGS. 13A and 13B, there is shown an exploded schematic view of boards and bars stacks for connection with the board(s). FIG. 13A is similar to the arrangements discussed above, in which each bar stack 36a, 36b, 36c 36d includes a number of bars 50 of varying length for connection at opposite ends thereof to paired ones of boards 24a-24b, etc.

In contrast, in FIG. 13B a board 24 is provided for connection with a first U-shaped bar stack 36a' and a second U-shaped bar stack 36b'. Each bar stack 36a', 36b' includes a number of bars of varying length for connection with the board 24. In the illustrated embodiment, three bars 50' are in each U-shaped bar stack, so three boards would be provided for connection to the upper ends of the different, height bars 50' in each bar stack 36a', 36b'. Bars 50' include opposite legs 50a' and 50b', and the lower ends of each leg 50a', 50b' is connected by a cross-connector 51' so that opposite sides of the board 24 can be connected to the upper ends of the bar 50'. With the U-shaped bars 50' it is possible to avoid board connections at one side of the electric machine.

Figure 14:
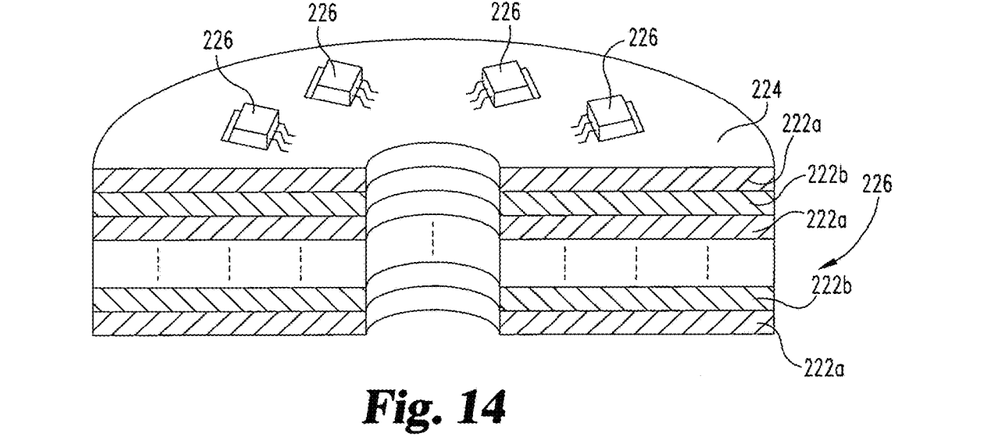
FIG. 14 is a schematic cross-sectional view of a single board employing multi-layer circuit board technology.

Referring to FIG. 14, the winding configurations disclosed herein can also be applied to a single, multi-layer board 220. With multiple layers 222a, 222b in a single board 220, it is possible to avoid multiple boards 22 such as shown in FIG. 1 and FIG. 13A. With multiple conductive layers 222a and non-conductive layers 222b between the conductive layers 222a, and the use of internal electrical connections between the conductive layers 222a, it is possible to simplify the design having all the conductive bars of the same height. For example, the bars 50 can reach to the first conductive layer and the connection to other layers will be made through internal via connections. The single, multi-layer board 220 is the most compact and simple in terms of assembly.

The external layers 224 of the single board 220 can include power electronic components 226 which enable an integrated drive with the end windings on the electric machine. In this embodiment, the internal conductive layers 222a and internal connections provide a connection from the bars and windings on the end of the board 220 to the power electronic components 226. Components 226 may include the drive and associated power electronics, including the controls, communications, power supply, power generation etc. The onboard power electronics also support multi-level inverters with series or parallel cascaded multi-phase machine topology.

The proposed winding configurations herein are applicable to all applications where random winding methods are used, and can be an alternative to form wound applications up to the current carrying capacity of boards 22, 220 which employ printed circuit board technology for the traces and winding connections. Applications in high power technological areas are contemplated with replacement of the boards 22, 220 with bus bars. Furthermore, as discussed above, the winding configurations are not limited to stator applications, but can also be employed with rotor applications.

The proposed winding configurations facilitate automation of the winding forming process and elimination of manually applied windings, providing faster manufacturing and lower manufacturing cost. Therefore, the boards 22 can be built through a robotic manufacturing process and assembly, eliminating at least some manual steps in the manufacturing process and reducing the number of manufacturing steps. In addition, the precision in the winding configuration and its high density application allows the size of the electric machine components to be reduced, providing a compact architecture with a higher filling factor and increased power density. In addition, part-to-part variation is reduced, reducing the need for over-design to meet performance requirements and providing a controlled thermal design. The ability to more accurately predict performance allows cost savings in the design. With the proposed automated manufacturing method having a known geometry and thermal design, it is possible to estimate the lifetime more accurately.

In addition, since the geometry of the winding configuration is precisely controlled during manufacturing, it is possible to achieve less variation in torque ripple. This enables potential feasibility in high performance applications space. Furthermore, the bearing placement and eccentricity control can be automated with real time feedback control using onboard magnetic, inductive or optical sensors.

Various aspects of the present disclosure are contemplated. According to one aspect, an electric machine includes at least one board including a yoke area of non-conductive material around a connector area. The board includes a first surface and an opposite second surface, and the first and second surfaces extend from an inner circumferential edge of the at least one board to an outer circumferential edge of the at least one board. The electric machine also includes a plurality of slots in the connector area that open toward the inner circumferential edge and at least one conductor bar in each of the slots. Each of the at least one conductor bars extends from the slot for connection to one of a second board and another conductor bar extending from an opposite slot of the at least one board. The electric machine also includes a winding configuration including a first end winding in the yoke area on the first surface, the first end winding extending from respective ones of a first portion of the slots to the outer circumferential edge. The winding configuration further includes a second end winding in the yoke area on the second surface, and the second end winding extending from respective ones of a second portion of the slots to the outer circumferential edge. Each of the first and the second end windings is electrically connected to the conductor bars in the plurality of slots.

In one embodiment, the outer circumferential edge includes an outer conductive trace thereon. In a refinement of this embodiment, each of the first and second end windings on the first and second surfaces is connected to the outer conductive trace.

In another embodiment, the at least one board includes a number of boards and the at least one conductor bar includes a corresponding number of conductor bars stacked in each of the slots. In a refinement of this embodiment, each of the number of conductor bars in the stack includes a different length extending between opposite ends thereof for connection with paired ones of the number of boards. In a further refinement, each of the opposite ends of the conductor bars is L-shaped for connection with an adjacent one of the number of boards in the connector area thereof.

In another embodiment, the electric machine includes a position sensor adjacent the inner circumferential edge. In yet another embodiment, the at least one conductor bar is U-shaped and includes a cross leg connected to another portion of the conductor bar extending from the opposite slot of the at least one board. In another embodiment, the at least one board includes a single board with multiple conductive layers between the first and second surfaces, the conductive layers being separated from one another by non-conductive layers.

In another embodiment, adjacent slots in the first portion of the slots are separated by one of the slots in the second portion of the slots. In a further embodiment, in a cross-section of the at least one board along a radius thereof, the first end winding includes first and second conductive traces in the yoke area on the first surface and the second end winding includes third and fourth conductive traces in the yoke area on the second surface.

In still another embodiment, the at least one board includes a rotor portion extending between the slots and the inner circumferential edge, and the winding configuration further includes a first plurality of conductive traces across the rotor portion on the first surface of the at least one board. The first plurality of conductive traces extend from respective ones of the first portion of the slots to the inner circumferential edge, and the winding configuration further includes, a second plurality of conductive trace across the rotor portion on the second surface of the at least one board. The second plurality of conductive traces extends from respective ones the second portion of the slots to the inner circumferential edge.

In another embodiment, the electrical machine is a multiple phase induction motor and the plurality of slots and the conductor bars in the slots form groups of at least a first phase cluster, a second phase cluster and a third phase cluster for each of the multiple phases of the motor. The first phase cluster of a first phase is separated from the second phase cluster of the first phase by the first phase clusters of the other ones of the multiple phases, and the second phase cluster of the first phase is separated from the third phase cluster of the first phase by the second phase clusters of the other ones of the multiple phases.

In a refinement of this embodiment, a number of phase clusters for each of the multiple phases corresponds to a number of poles of the induction motor. In another refinement, the winding configuration further includes end windings configured to connect a first end of a first conductor bar in the first phase cluster to a first end of a first bar of the second phase cluster, a second end of the first bar of the second phase cluster to a second end of a first bar in the third phase cluster, a first end of a second bar in the first phase cluster to a first end of a second bar in the second phase cluster, and a second end of the second bar in the second phase cluster to a second end of a second bar in the third phase cluster.

In another refinement, the winding configuration includes end windings configured to connect a first end of a first bar in the first phase cluster to a first end of a first bar of the second phase cluster, a second end of the first bar of the second phase cluster to a second end of a second bar of the first phase cluster, a first end of the second bar of the first phase cluster to a first end of a second bar of the second phase cluster, a second end of the second bar of the second phase cluster to a second end of a third bar of the first phase cluster, and a first end of the third bar of the first phase cluster to a first end of a third bar of the second phase cluster.

According to another aspect, an electric motor includes a stator with a plurality of slots defining a plurality of pole clusters for each phase of the electrical machine and a winding configuration on the stator with a plurality of overlapping end windings. A first one of the plurality of overlapping end windings runs in a first direction to lap a first pole cluster of a first phase of the electric motor with a second pole cluster of the first phase. A second one of the plurality of overlapping end windings runs in a second direction opposite the first direction to lap a third pole cluster of the first phase, with the second pole cluster. A third one of the plurality of overlapping end windings runs in the first direction to lap the third pole cluster with a fourth pole cluster of the first phase.

In one embodiment, the electric motor includes a conductive bar in each of the plurality of slots, and a first end of the conductive bar is connected to the stator and an opposite second end of the conductive bar is connected to a second stator. In a refinement of this embodiment the second stator includes a second winding configuration that is the same as the winding configuration on the stator.

In another aspect, an electric motor includes at least one board with a plurality of slots, the plurality of slots defining at least two phase clusters for each phase of the electrical machine. The at least two phase clusters in each phase are separated by one of the phase clusters of each the other phases. The motor includes at least one conductor bar in respective ones of the plurality of slots and a winding configuration on the stator. The winding configuration includes a first end winding connecting a first phase cluster of a first phase to a second phase cluster of the first phase, a second end winding overlapping the first end winding and connecting a first phase cluster of a second phase to a second phase cluster of the second phase, and a third end winding overlapping the first and second end windings, the third end winding connecting a first phase cluster of a third phase to a second phase cluster of the third phase.

In one embodiment, the at least one board includes a plurality of boards and the at least one conductor bar includes a plurality of conductor bars positioned in aligned slots of the plurality of boards to connect paired boards to one another. In another embodiment, each of the first, second and third end windings includes conductive traces on opposite first and second surfaces of the at least one board.

In yet another embodiment, the at least one board includes a planar body extending between an inner circumferential edge and an outer circumferential edge. The at least one board includes a yoke area of non-conductive material adjacent the outer circumferential edge and a connector area between the yoke area and the inner circumferential edge, and the connector area is comprised of conductive material and the plurality of slots are defined in the connector area.

As used herein the term "configured" should be interpreted to mean that the identified elements, components, or other subject matter are selected, created, implemented, utilized, designed, modified, adjusted and/or intended to perform the indicated action and/or to perform, operate, behave and/or react in the indicated manner.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, recitation of "a," "a first" or "the" element, or the equivalent thereof, should be understood to include incorporation of one or more such elements, neither requiring nor excluding two or more such elements, unless the context clearly indicates otherwise. As used herein, the terms "having", "containing", "including", "comprising" and the like are open ended terms that indicate the presence of stated elements or features, but do not preclude additional elements or features.

Applicant reserves the right to submit claims directed to certain combinations and subcombinations that are directed to one of the disclosed inventions and are believed to be novel and non-obvious. Inventions embodied in other combinations and subcombinations of features, functions, elements and/or properties may be claimed through amendment of those claims or presentation of new claims in that or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. An electric machine, comprising:
    at least one board including a yoke area of non-conductive material around a connector area, the board including a first surface and an opposite second surface, the first and second surfaces extending from an inner circumferential edge of the at least one board to an outer circumferential edge of the at least one board;
    a plurality of slots in the connector area that open toward the inner circumferential edge;
    at least one conductor bar in each of the slots, each of the at least one conductor bars extending from the slot for connection to one of a second board and another conductor bar extending from an opposite slot of the at least one board; and
    a winding configuration including a first end winding in the yoke area on the first surface, the first end winding extending from respective ones of a first portion of the slots to the outer circumferential edge, the winding configuration further including a second end winding in the yoke area on the second surface, the second end winding extending from respective ones of a second portion of the slots to the outer circumferential edge, wherein each of the first and the second end windings is electrically connected to the conductor bars in the plurality of slots.

2. The electric machine of claim 1, wherein the outer circumferential edge includes an outer conductive trace thereon.

3. The electric machine of claim 2, wherein each of the first and second end windings on the first and second surfaces is connected to the outer conductive trace.

4. The electric machine of claim 1, wherein the at least one board includes a number of boards and the at least one conductor bar includes a corresponding number of conductor bars stacked in each of the slots.

5. The electric machine of claim 4, wherein each of the number of conductor bars in the stack includes a different length extending between opposite ends thereof for connection with paired ones of the number of boards.

6. The electric machine of claim 5, wherein each of the opposite ends of the conductor bars is L-shaped for connection with an adjacent one of the number of boards in the connector area theeof.

7. The electric machine of claim 1, further comprising a position sensor adjacent the inner circumferential edge.

8. The electric machine of claim 1, wherein the at least one conductor bar is U-shaped and includes a cross leg connected to another portion of the conductor bar extending from the opposite slot of the at least one board.

9. The electric machine of claim 1, wherein the at least one board includes a single board with multiple conductive layers between the first and second surfaces, the conductive layers being separated from one another by non-conductive layers.

10. The electric machine of claim 1, wherein adjacent slots in the first portion of the slots are separated by one of the slots in the second portion of the slots.

11. The electric machine of claim 1, wherein in a cross-section of the at least one board along a radius thereof, the first end winding includes first and second conductive traces in the yoke area on the first surface and the second end winding includes third and fourth conductive traces in the yoke area on the second surface.

12. The electric machine of claim 1, wherein the at least one board includes a rotor portion extending between the slots and the inner circumferential edge, and the winding configuration further includes a first plurality of conductive traces across the rotor portion on the first surface of the at least one board, the first plurality of conductive traces extending from respective ones of the first portion of the slots to the inner circumferential edge, the winding configuration further including a second plurality of conductive trace across the rotor portion on the second surface of the at least one board, the second plurality of conductive traces extending from respective ones the second portion of the slots to the inner circumferential edge.

13. The electric machine of claim 1, wherein the electrical machine is a multiple phase induction motor and the plurality of slots and the conductor bars in the slots form groups of at least a first phase cluster, a second phase cluster and a third phase cluster for each of the multiple phases of the motor, wherein the first phase cluster of a first phase is separated from the second phase cluster of the first phase by the first phase clusters of the other ones of the multiple phases, and further wherein the second phase cluster of the first phase is separated from the third phase cluster of the first phase by the second phase clusters of the other ones of the multiple phases.

14. The electric machine of claim 13, wherein a number of phase clusters for each of the multiple phases corresponds to a number of poles of the induction motor.

15. The electrical machine of claim 13, wherein the winding configuration further includes end windings configured to connect:

a first end of a first conductor bar in the first phase cluster to a first end of a first bar of the second phase cluster;

a second end of the first bar of the second phase cluster to a second end of a first bar in the third phase cluster;

a first end of a second bar in the first phase cluster to a first end of a second bar in the second phase cluster; and a second end of the second bar in the second phase cluster to a second end of a second bar in the third phase cluster.

16. The electrical machine of claim 13, wherein the winding configuration includes end windings configured to connect:

a first end of a first bar in the first phase cluster to a first end of a first bar of the second phase cluster;

a second end of the first bar of the second phase cluster to a second end of a second bar of the first phase cluster;

a first end of the second bar of the first phase cluster to a first end of a second bar of the second phase cluster;

a second end of the second bar of the second phase cluster to a second end of a third bar of the first phase cluster; and a first end of the third bar of the first phase cluster to a first end of a third bar of the second phase cluster.

17. An electric motor, comprising:

a stator with a plurality of slots defining a plurality of pole clusters for each phase of the electrical machine; and a winding configuration on the stator with a plurality of overlapping end windings, wherein a first one of the plurality of overlapping end windings runs in a first direction to lap a first pole cluster of a first phase of the electric motor with a second pole cluster of the first phase, and further wherein a second one of the plurality of overlapping end windings runs in a second direction opposite the first direction to lap a third pole cluster of the first phase with the second pole cluster, and further wherein a third one of the plurality of overlapping end windings runs in the first direction to lap the third pole cluster with a fourth pole cluster of the first phase.

18. The electric motor of claim 17, further comprising a conductive bar in each of the plurality of slots, wherein a first end of the conductive bar is connected to the stator and an opposite second end of the conductive bar is connected to a second stator.

19. The electric motor of claim 18, wherein the second stator includes a second winding configuration that is the same as the winding configuration on the stator.

20. An electric motor, comprising:

at least one board with a plurality of slots, the plurality of slots defining at least two phase clusters for each phase of the electrical machine, wherein the at least two phase clusters in each phase are separated by one of the phase clusters of each the other phases;

at least one conductor bar in respective ones of the plurality of slots;

a winding configuration on the stator, the winding configuration including:

a first end winding connecting a first phase cluster of a first phase to a second phase cluster of the first phase;

a second end winding overlapping the first end winding and connecting a first phase cluster of a second phase to a second phase cluster of the second phase; and a third end winding overlapping the first and second end windings, the third end winding connecting a first phase cluster of a third phase to a second phase cluster of the third phase.

21. The electric motor of claim 20, wherein the at least one board includes a plurality of boards and the at least one conductor bar includes a plurality of conductor bars positioned in aligned slots of the plurality of boards to connect paired boards to one another.

22. The electrical machine of claim 20, wherein each of the first, second and third end windings includes conductive traces on opposite first and second surfaces of the at least one board.

23. The electrical machine of claim 20, wherein the at least one board includes a planar body extending between an inner circumferential edge and an outer circumferential edge, wherein the at least one board includes a yoke area of non-conductive material adjacent the outer circumferential edge and a connector area between the yoke area and the inner circumferential edge, wherein the connector area is comprised of conductive material and the plurality of slots are defined in the connector area.

* * * * *